(12) United States Patent
Maeda et al.

(10) Patent No.: US 6,825,855 B2
(45) Date of Patent: Nov. 30, 2004

(54) MAP DISPLAY METHOD IN NAVIGATION SYSTEM AND NAVIGATION APPARATUS

(75) Inventors: Atsushi Maeda, Tokyo (JP); Shigeaki Asano, Aichi (JP); Shigeki Nakane, Aichi (JP); Atsushi Watanabe, Aichi (JP)

(73) Assignees: Mitsubishi Denki Kabushiki Kaisha, Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 171 days.

(21) Appl. No.: 09/988,750

(22) Filed: Nov. 20, 2001

(65) Prior Publication Data
US 2002/0149586 A1 Oct. 17, 2002

(30) Foreign Application Priority Data
Apr. 13, 2001 (JP) ........................................ 2001-115841

(51) Int. Cl.$^7$ .......................... G09G 5/00; G08G 1/123
(52) U.S. Cl. ........................................ 345/629; 340/988
(58) Field of Search .................................. 345/629, 630, 345/634, 635, 636; 340/988; 701/208

(56) References Cited

U.S. PATENT DOCUMENTS

| | | | | |
|---|---|---|---|---|
| 3,580,978 A | * | 5/1971 | Ebeling | 434/43 |
| 3,652,836 A | * | 3/1972 | Richardson et al. | 701/203 |
| 4,792,906 A | * | 12/1988 | King et al. | 701/5 |
| 5,732,385 A | * | 3/1998 | Nakayama et al. | 701/201 |
| 5,945,927 A | * | 8/1999 | Nakayama et al. | 340/995.14 |
| 6,026,309 A | * | 2/2000 | Moon et al. | 455/566 |
| 6,088,654 A | * | 7/2000 | Lepere et al. | 701/301 |
| 6,157,342 A | * | 12/2000 | Okude et al. | 342/357.13 |
| 6,169,516 B1 | * | 1/2001 | Watanabe et al. | 342/357.13 |
| 6,233,522 B1 | * | 5/2001 | Morici | 701/208 |
| 6,246,413 B1 | * | 6/2001 | Teo | 345/419 |
| 6,289,278 B1 | * | 9/2001 | Endo et al. | 701/208 |
| 6,326,964 B1 | * | 12/2001 | Snyder et al. | 345/419 |
| 6,347,263 B1 | * | 2/2002 | Johnson et al. | 701/14 |
| 6,628,278 B1 | * | 9/2003 | Ritter | 345/419 |
| 2001/0028350 A1 | * | 10/2001 | Matsuoka et al. | 345/427 |
| 2001/0048377 A1 | * | 12/2001 | Mochizuki et al. | 340/988 |
| 2002/0011941 A1 | * | 1/2002 | Endo et al. | 340/995 |
| 2002/0038181 A1 | * | 3/2002 | Okude et al. | 701/208 |

FOREIGN PATENT DOCUMENTS

JP 07-220055 8/1995

* cited by examiner

Primary Examiner—Jeffery Brier
Assistant Examiner—Ryan Yang
(74) Attorney, Agent, or Firm—Birch, Stewart, Kolasch & Birch, LLP (57) ABSTRACT

A map display method in a navigation system has a bird's-eye view display function of displaying a map image in conjunction with a background image. The map display method in a navigation system has a step of displaying a horizon that indicates a boundary between the map image and the background image, and is rounded at least in part. Besides the bird's-eye view display effect, the method can enhance a sense of realism of the bird's-eye view display. Thus, it can solve a problem of a conventional method in that the bird's-eye view display effect cannot be achieved satisfactorily because the conventional method displays a pseudo horizon in a straight line to indicate the boundary between the map image region and the background image region.

4 Claims, 9 Drawing Sheets

MAP DISPLAY METHOD IN NAVIGATION SYSTEM AND NAVIGATION APPARATUS

BACKGROUND OF THE INVENTION

1. Field of the Invention

The present invention relates to a map display method in a navigation system and a navigation apparatus having a bird's-eye view display function that provides visual effect as though its map image were seen from above obliquely.

2. Description of Related Art

Figure 11:
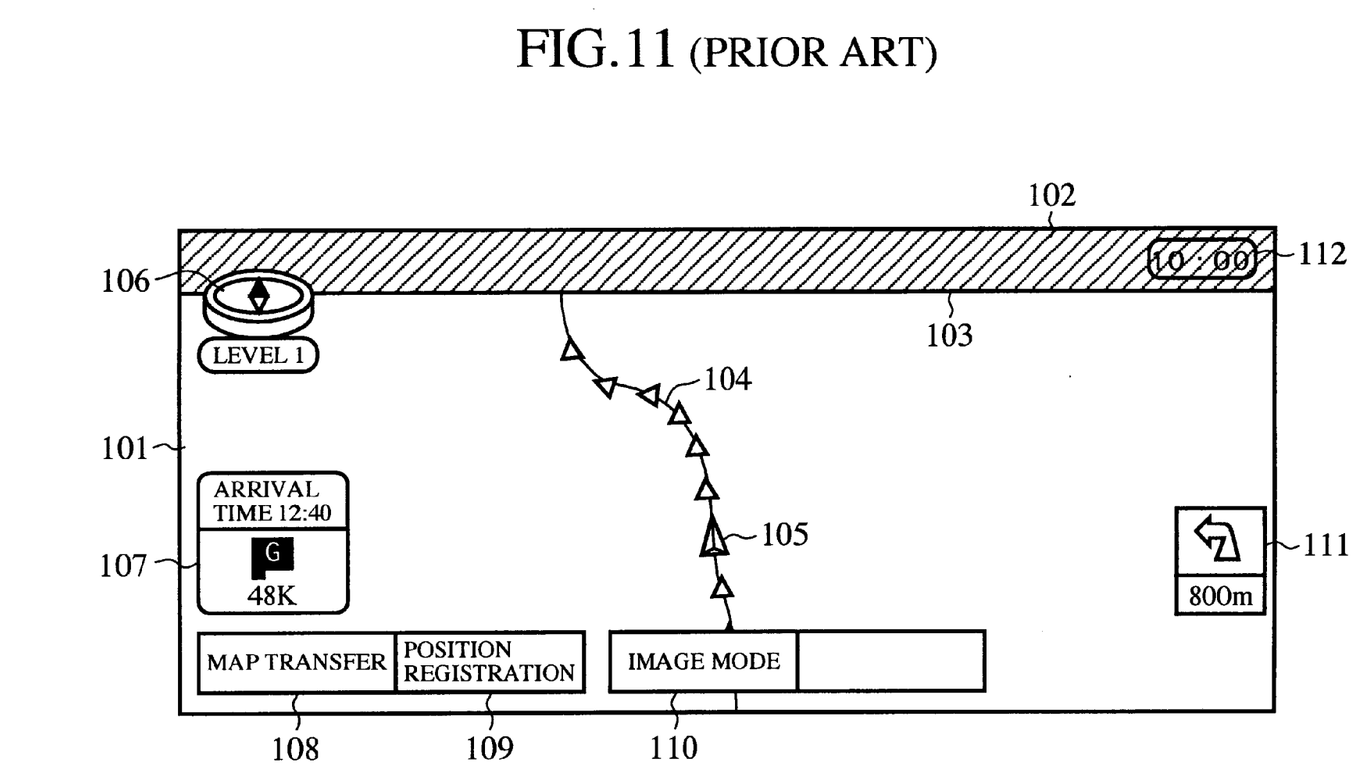
FIG. 11 is a diagram showing a display state on the monitor of a conventional navigation apparatus.

For example, Japanese patent application laid-open No. 7-220055 discloses a navigation system with a bird's-eye view display function. It carries out calculations needed for the bird's-eye view display by processing the map data of each predetermined square block according to display parameters such as a display reference point (for example, the position of the vehicle itself) and a display angle, and draws a bird's-eye view as shown in FIG. 11 using the calculation result. The bird's-eye view display can provide an enlarged view of the information near the display reference point (the position of the vehicle itself) together with information about distant areas. Accordingly, it can reduce the frequency of map switching, thereby improving its operability.

In FIG. 11, the reference numeral 101 designates a map image region; 102 designates a background image region; 103 designates a horizon representing the boundary between the two regions; 104 designates a retrieved route displayed in the map image region 101; and 105 designates the position of the vehicle itself displayed on the retrieved route 104. At the periphery of the map image region 101, there are displayed a bearing display mark 106, a display mark 107 of the distance to a destination and predicted arrival time, a map transfer switch 108, a position registration switch 109, an image mode switch 110, a distance display mark 111 indicating the distance to the next corner and the like. Besides, current time 112 is displayed on the background image region 102.

With the foregoing configuration, the conventional navigation system has the following problem with the bird's-eye view display. Although it sets a pseudo horizon 103 as a boundary between the map image region 101 and the background image region 102 that limits the display range of the map image, since the pseudo horizon is a straight line, it provides a viewer with little realism, presenting a problem of being unable to achieve enough effect of the bird's-eye view display.

SUMMARY OF THE INVENTION

The present invention is implemented to solve the foregoing problem. It is therefore an object of the present invention to provide a map display method in a navigation system and a navigation apparatus capable of enhancing a sense of realism by rounding the horizon.

According to a first aspect of the present invention, there is provided a map display method in a navigation system having a bird's-eye view display function of displaying a map image in conjunction with a background image, the map display method in a navigation system comprises a step of displaying a horizon that indicates a boundary between the map image and the background image, and is rounded at least in part.

Here, the map display method in a navigation system may further comprise the steps of: preparing a plurality of background data to be pasted with different degrees of roundness of the horizon; selecting one of the background data to be pasted in accordance with a display scaling; and displaying the background data with super imposing the background data upon the map data.

The map display method in a navigation system may further comprise the steps of: preparing a plurality of background data to be pasted with different degrees of roundness of the horizon; selecting one of the background data to be pasted in accordance with a vehicle speed; and displaying the background data with superimposing the background data upon the map data.

The horizon may be rounded within a display inhibition region which is adjacent to the background image, and in which display of a land mark or a destination mark of the map image is inhibited.

According to a second aspect of the present invention, there is provided a navigation apparatus comprising: a bird's-eye view generating section for generating a bird's-eye view from map data input in accordance with a display target area; a display section for displaying the bird's-eye view; and a horizontal background data generating section for generating background data including a rounded horizon as a background image to be superimposed upon a map image corresponding to the map data.

Here, the navigation apparatus may further comprise: a memory for storing a plurality of background data to be pasted with different degrees of roundness of the horizon; a display scaling decision section for deciding a display scaling; and a horizontal roundness decision section for deciding a degree of roundness of the horizon in accordance with the display scaling determined by the display scaling decision section, wherein the horizontal background data generating section may read from the memory the background data to be pasted with the degree of roundness determined by the horizontal roundness decision section.

The navigation apparatus may further comprise: a memory for storing a plurality of background data to be pasted with different degrees of roundness of the horizon; and a horizontal roundness decision section for deciding a degree of roundness of the horizon in response to a speed of a vehicle detected by a vehicle speed sensor, wherein the horizontal background data generating section may read from the memory the background data to be pasted with the degree of roundness determined by the horizontal roundness decision section.

The display target area may be decided in accordance with a display scaling, a display angle, a display position and a bearing of a vehicle.

DETAILED DESCRIPTION OF THE PREFERRED EMBODIMENTS

The invention will now be described with reference to the accompanying drawings.

Embodiment 1

Figure 1:
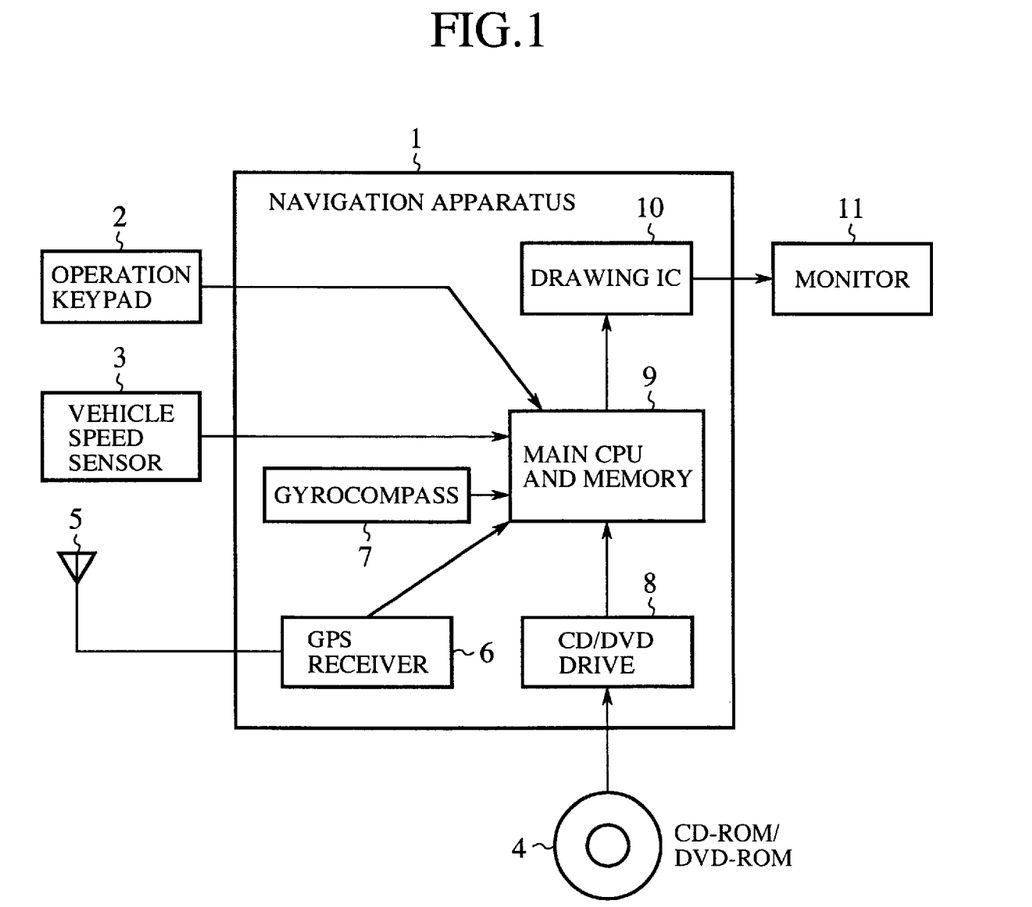
FIG. 1 is a block diagram showing a configuration of a navigation apparatus of an embodiment 1 in accordance with the present invention.

FIG. 1 is a block diagram showing a configuration of a navigation apparatus of an embodiment 1 in accordance with the present invention. In FIG. 1, the reference numeral 1 designates a navigation apparatus; 2 designates an operation keypad for inputting data to the navigation apparatus 1; 3 designates a vehicle speed sensor for detecting the vehicle speed; and 4 designates a CD-ROM or DVD-ROM that stores the map data.

The navigation apparatus 1 comprises a GPS receiver 6 with an antenna 5 for receiving satellite radio waves; a gyrocompass 7 for detecting the bearing of the vehicle; a CD/DVD drive 8 for reading map data from the CD-ROM or DVD-ROM; a main CPU 9 with a memory for executing various calculations; and a drawing IC 10 for generating a display image from the information fed from the main CPU 9. The reference numeral 11 designates a monitor for displaying the image produced by the drawing IC 10.

Figure 2:
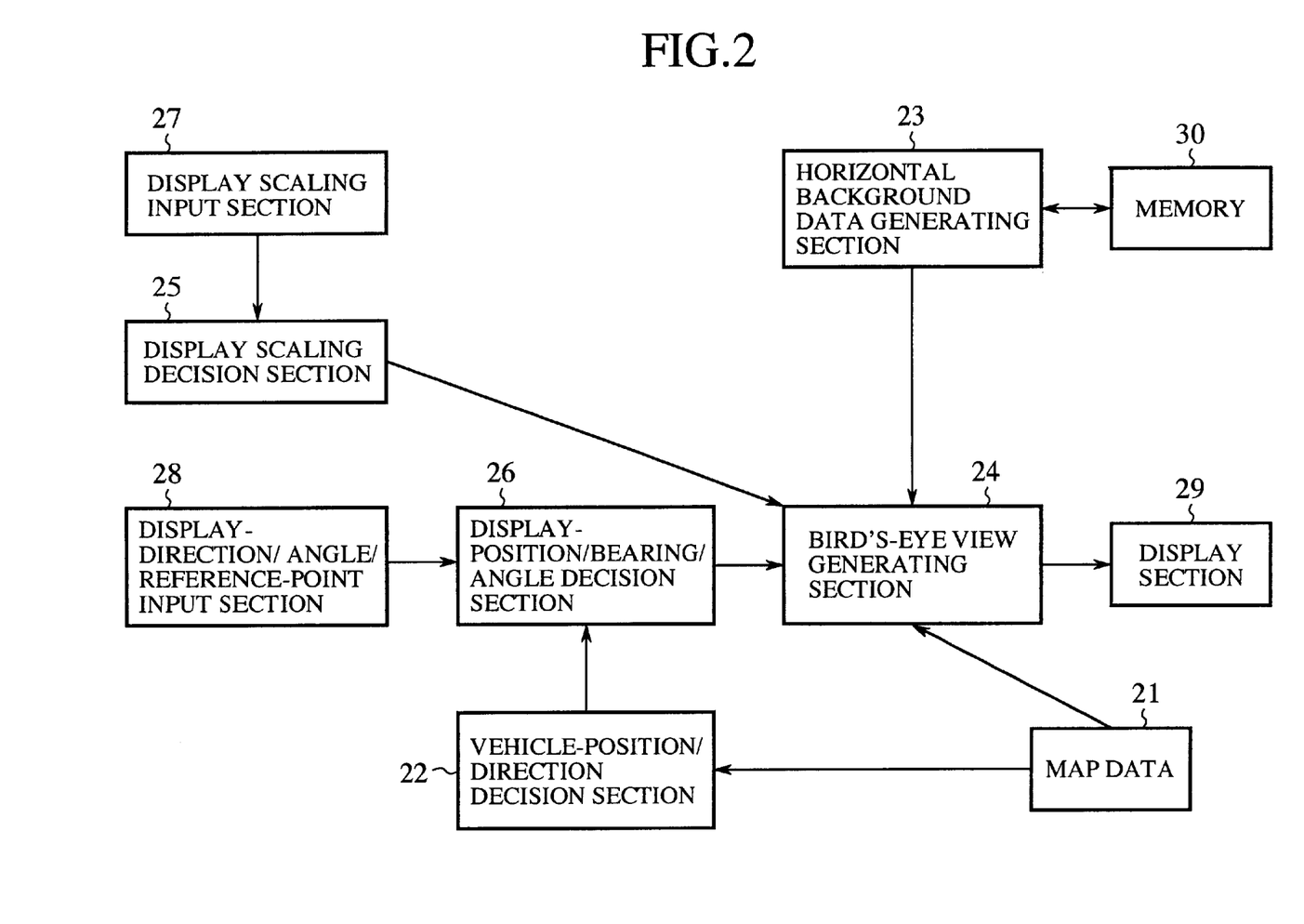
FIG. 2 is a functional block diagram of the navigation apparatus as shown in FIG. 1.

FIG. 2 is a functional block diagram of the navigation apparatus as shown in FIG. 1. The correspondence between the components of the two figures are as follows. Map data 21 correspond to the CD-ROM 4 and CD/DVD drive 8 of FIG. 1. A vehicle-position/direction decision section 22 corresponds to a part of the main CPU 9 of FIG. 1. It decides the position and direction of the vehicle itself from the data fed from the vehicle speed sensor 3, gyrocompass 7 and GPS receiver 6 and the map data 21. A horizontal background data generating section 23, a bird's-eye view generating section 24, a display scaling decision section 25, and a display-position/bearing/angle decision section 26 are a part of the main CPU 9, each. A display scaling input section 27 and a display-direction/angle/reference-point input section 28 corresponds to the operation keypad 2 of FIG. 1. A display section 29 corresponds to the monitor 11.

Next, the operation of the present embodiment 1 will be described.

Figure 3:
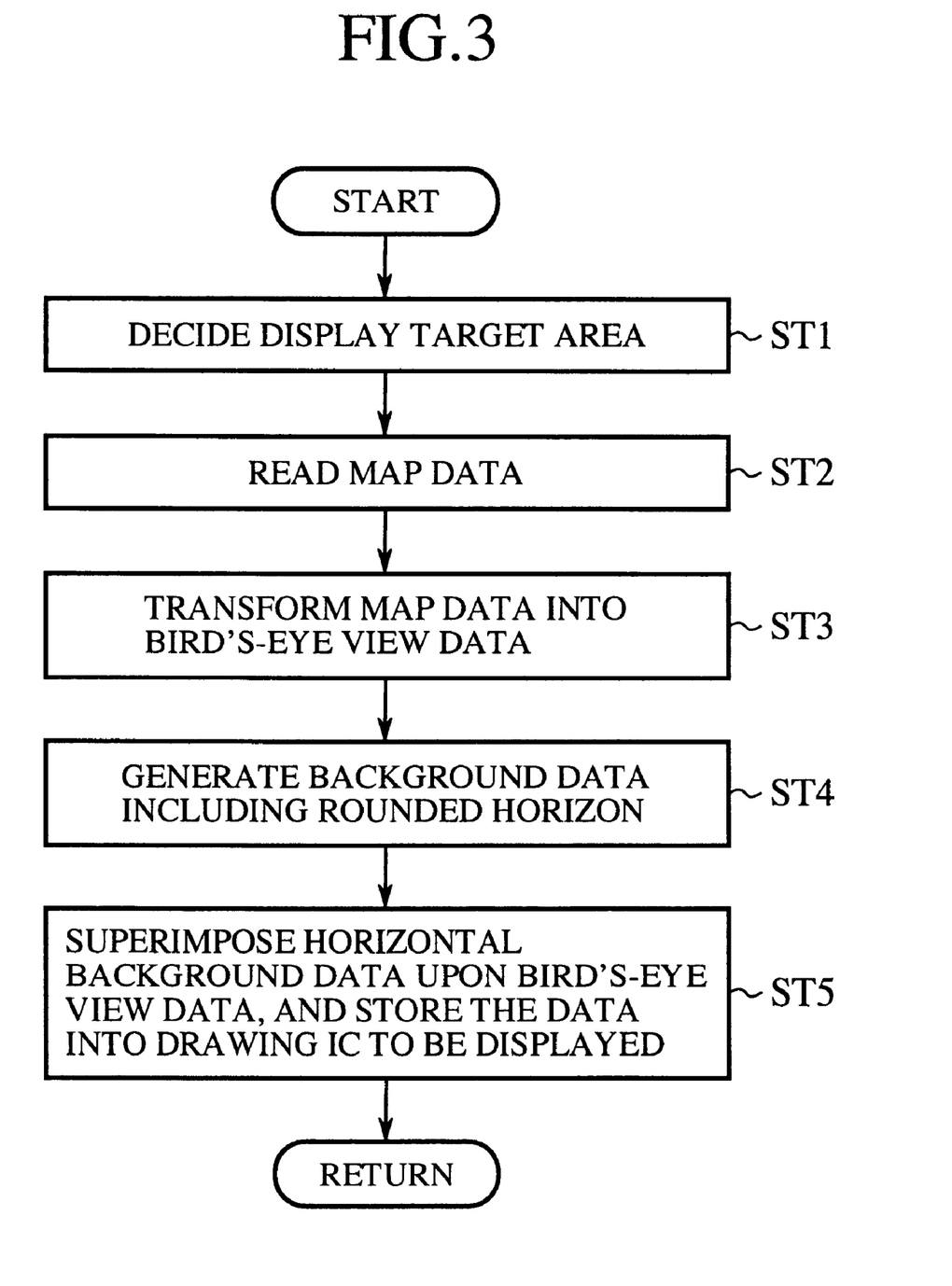
FIG. 3 is a flowchart illustrating the operation of the embodiment 1.

FIG. 3 is a flowchart illustrating the operation of the present embodiment 1. Upon the start of the operation, the following steps are taken:

(1) The display-position/bearing/angle decision section 26 decides the area to be displayed from the signals fed from the vehicle-position/direction decision section 22 and display-direction/angle/reference-point input section 28 in response to the vehicle speed signal from the vehicle speed sensor 3, the vehicle bearing signal from the gyrocompass 7, the received signal of the GPS receiver 6, the map data read from the CD-ROM/DVD-ROM 4 via the CD/DVD drive 8, and the display angle signal and display scaling signal input by a user via the operation keypad 2 (step ST1).

(2) The display-position/bearing/angle decision section 26 reads the map data 21 corresponding to the decided area from the CD-ROM/DVD-ROM 4 via the CD/DVD drive 8 (step ST2).

(3) The bird's-eye view generating section 24 (main CPU 9) transforms the map data 21 to the bird's-eye view data by computation (step ST3).

(4) The horizontal background data generating section 23 generates the background data including a rounded horizon. Although the background data including the rounded horizon can be generated by processing data, the present embodiment 1 reads the background data including the rounded horizon from a memory 30 that stores the data in advance (step ST4).

Figure 4:
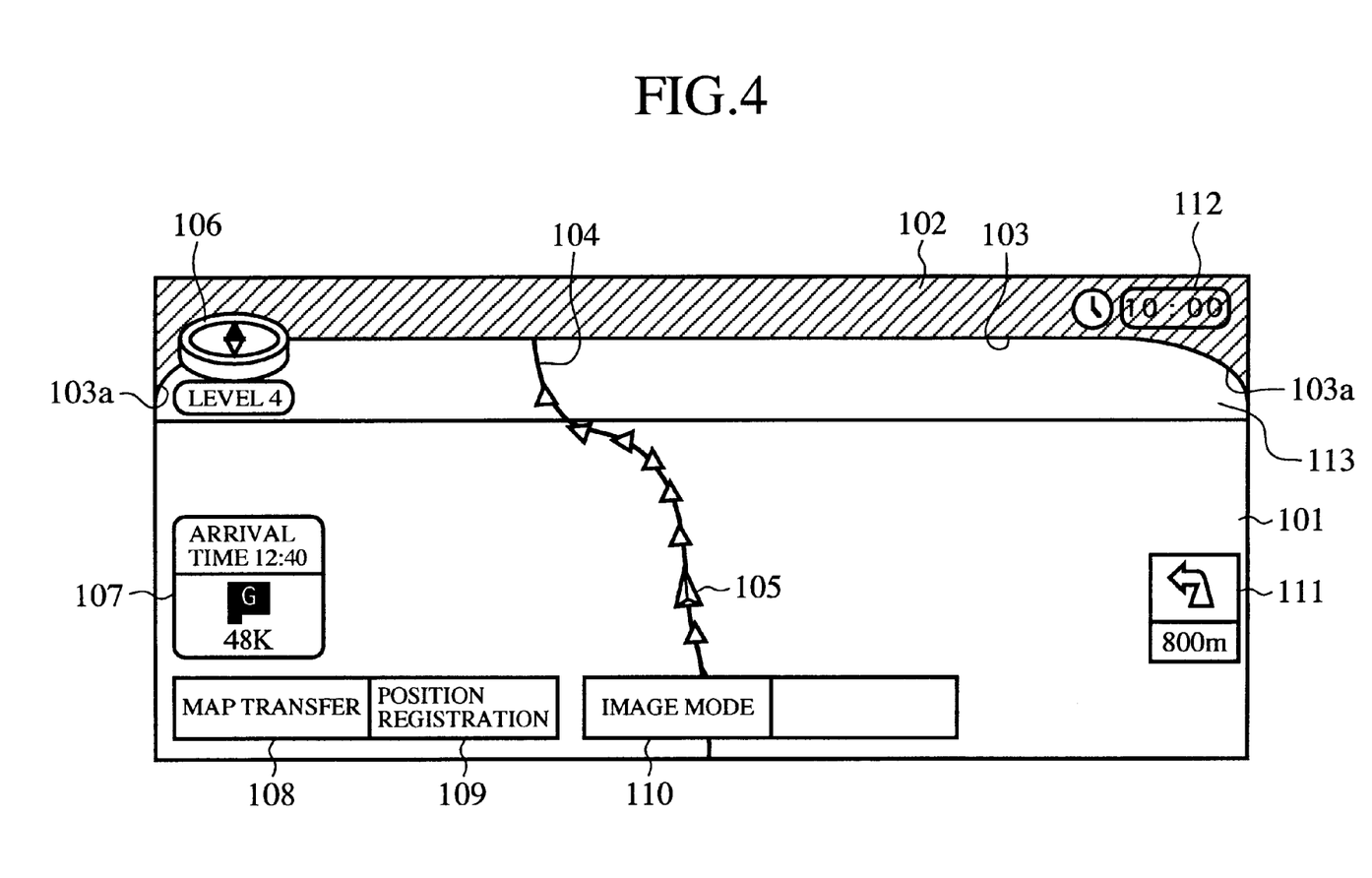
FIG. 4 is a diagram showing an example of the display on the monitor of the embodiment 1.

(5) The bird's-eye view generating section 24 superimposes the background data including the rounded horizon generated at step ST4 upon the bird's-eye view data generated at step ST3, stores the resultant data into the drawing IC 10, and displays the data on the display section 29 (monitor 11) as shown in FIG. 4 (step ST5).

In FIG. 4, the reference numeral 103a designates rounded corners at the ends of the horizon 103 indicating the boundary between the map image region 101 and the background image region 102. Since the remaining reference numerals designate the same items to those of FIG. 11, the description thereof is omitted here.

Although the present embodiment 1 employs, as its display reference point, the position of the vehicle itself that is estimated by the map-matching using the vehicle speed signal fed from the vehicle speed sensor 3, the vehicle bearing signal obtained by the gyrocompass 7, the received signal by the GPS receiver 6 and the map data read from the CD-ROM/DVD-ROM 4 by the CD/DVD drive 8, this is not essential. For example, a position specified by a user in his or her map scrolling operation can be used as the display reference point.

As described above, the present embodiment 1 is configured such that the horizon is rounded which represents the boundary between the map image region and the background image region in the bird's-eye view display. Thus, it can achieve the bird's-eye view display with adding a sense of realism. In addition, superimposing the background data read from the memory upon the map data transformed into the bird's-eye view can facilitate the display of the horizon with rounded curves between the map image region and the background image region.

Embodiment 2

Figure 5:
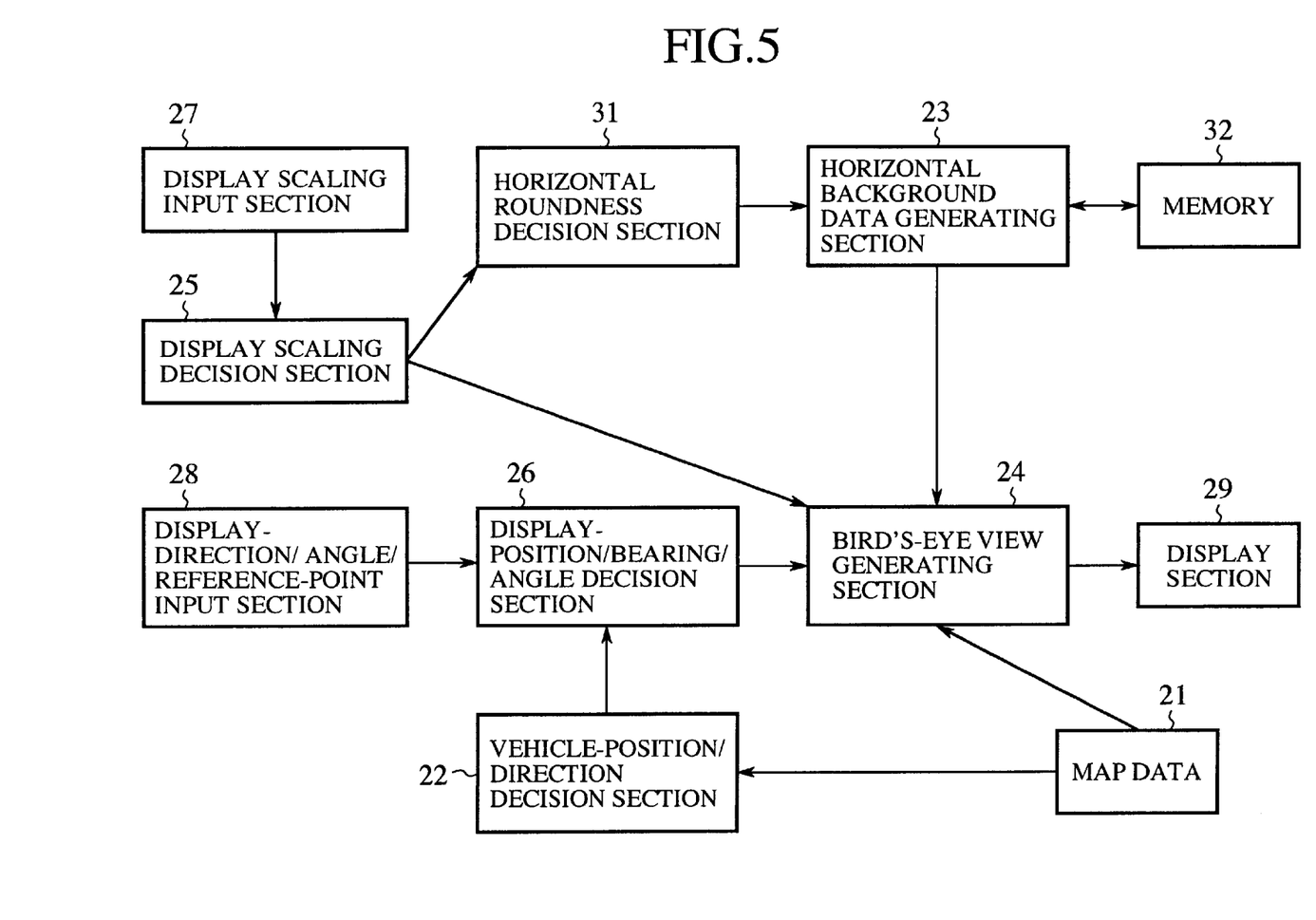
FIG. 5 is a functional block diagram of the navigation apparatus of an embodiment 2 in accordance with the present invention.

Although the roundness of the horizon is fixed in the foregoing embodiment 1, the present embodiment 2 varies the degree of roundness in accordance with the display scaling, thereby enhancing the sense of realism of the bird's-eye view display. FIG. 5 is a functional block diagram of the present embodiment 2, in which a horizontal roundness decision section 31 for deciding the degree of roundness in accordance with the display scaling is added to the functional block diagram of the foregoing embodiment 1. The horizontal roundness decision section 31 decides the roundness in accordance with the display scaling that is input from the display scaling decision section 25. According to the decision result, the horizontal background data generating section 23 reads a horizontal pasted pattern from the memory 32, and generates the horizontal background data. Thus, the roundness of the horizon of the bird's-eye view varies in accordance with the display scaling.

Figure 6:
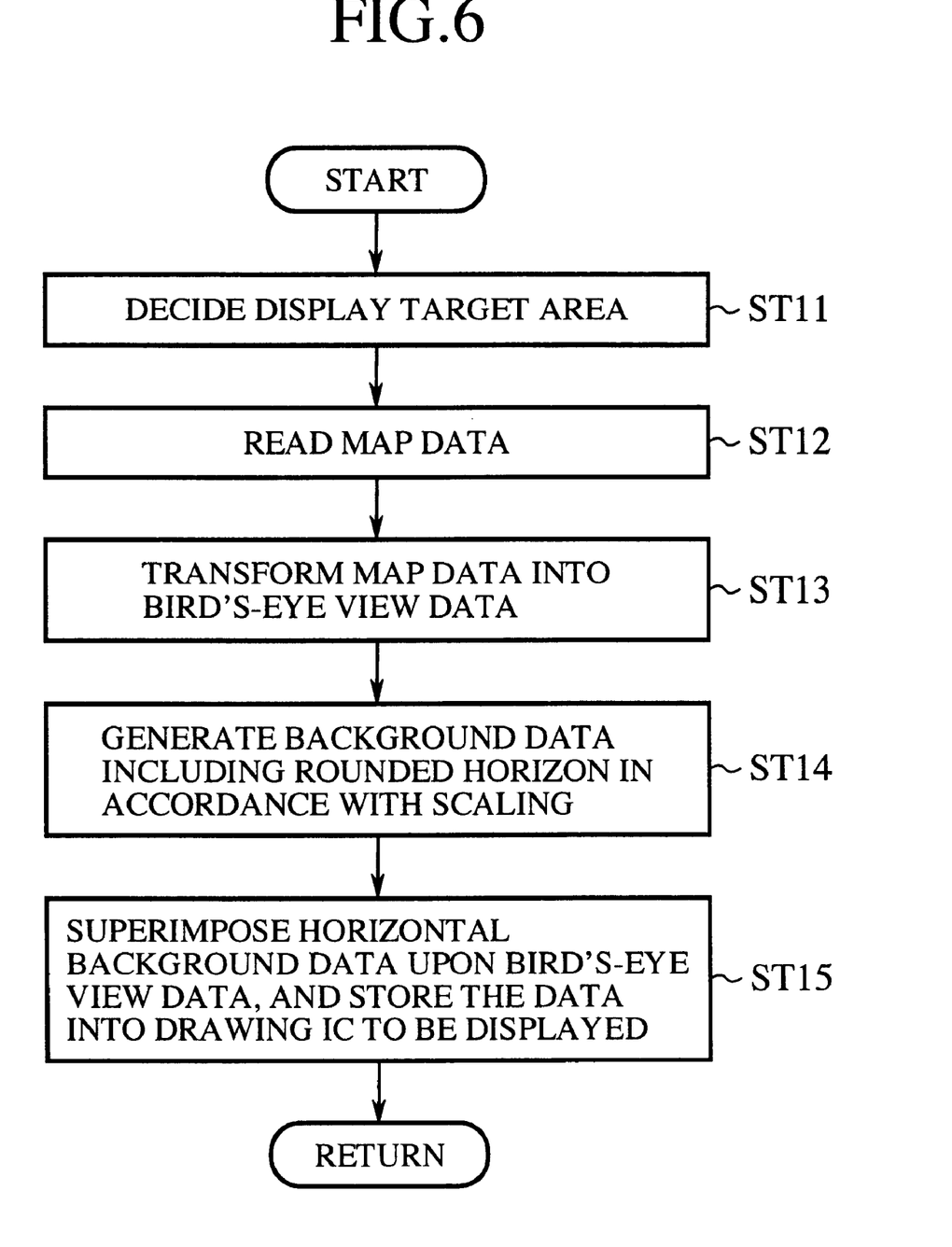
FIG. 6 is a flowchart illustrating the operation of the embodiment 2.

FIG. 6 is a flowchart illustrating the processing of the present embodiment 2, in which steps ST11–ST13 are the same as the steps ST1–ST3 of FIG. 3 of the foregoing embodiment 1. They differ only in the horizontal background data.

Figure 7:
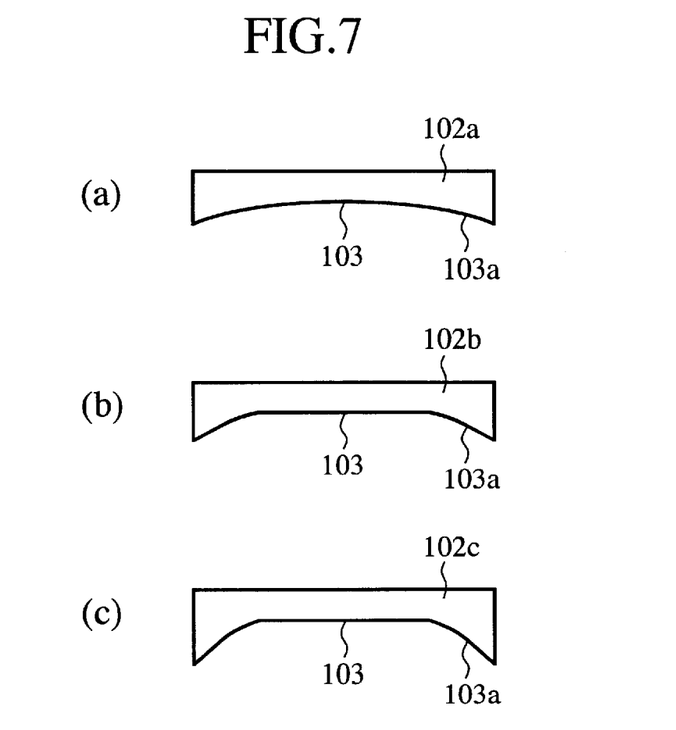
FIG. 7 is a diagram showing background patterns to be stored in a memory in advance, which are designed in accordance with a display scale and have different roundness.

Specifically, although the foregoing embodiment 1 displays the horizon with the fixed roundness at the boundary between the map image region and the background image region regardless of the display scaling, the present embodiment 2 generates the horizontal background data with the roundness corresponding to the display scaling that is input by the user from the operation keypad 2, and is decided by the display scaling decision section 25 (step ST14). The horizontal background data is decided as follows. First, a plurality of horizontal background data 102a–102c differing their roundness are generated as shown in FIG. 7 in accordance with the display scaling. Second, these horizontal background data are stored in the memory 32 in advance, and one of them is read from the memory 32 in accordance with the display scaling.

Subsequently, the background data including the rounded horizon produced at step ST14 is superimposed upon the bird's-eye view data generated at step ST13 to be stored in the drawing IC 10, and then displayed on the display section 29 (monitor 11) at step ST15.

Figure 8:
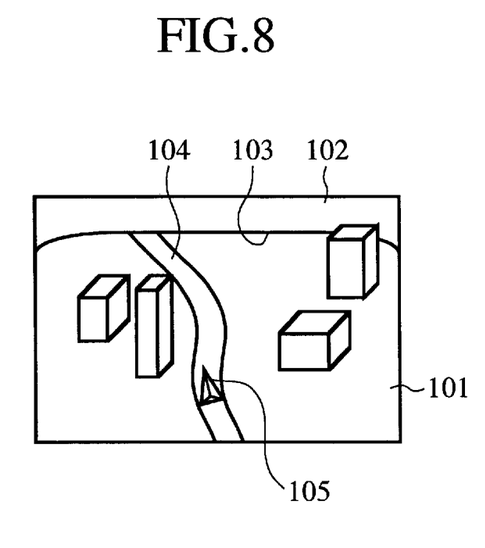
FIG. 8 is an example of a detailed map viewed from a low angle.
Figure 9:
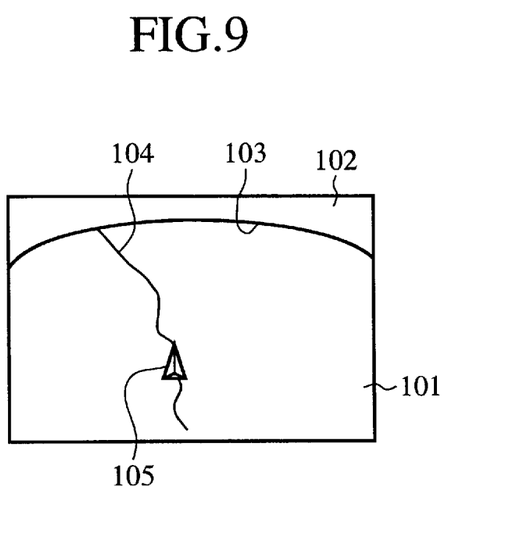
FIG. 9 is an example of a general map viewed from a high angle.

FIG. 8 is an example of a detailed map of the present embodiment 2 viewed from a low angle, and FIG. 9 is an example of a general map viewed from a high angle. In these figures, the degree of roundness of the horizon 103 differs in accordance with the display scaling.

As described above, the present embodiment 2 is configured such that it varies the degree of roundness of the horizontal background data of the bird's-eye view in accordance with the display scaling. As a result, the present embodiment 2 can vary the horizon such that it becomes more linear in the detailed map viewed from a lower angle as shown in FIG. 8, and more round in the general map viewed from a higher angle, thereby further enhancing the sense of realism of the bird's-eye view display.

Embodiment 3

Although the foregoing embodiment 2 varies the degree of roundness in accordance with the display scaling, the present embodiment 3 varies it in accordance with the vehicle speed. Thus, the present embodiment 3 can offer a bird's-eye view display with a sense of realism similar to that of the foregoing embodiment 2.

Figure 10:
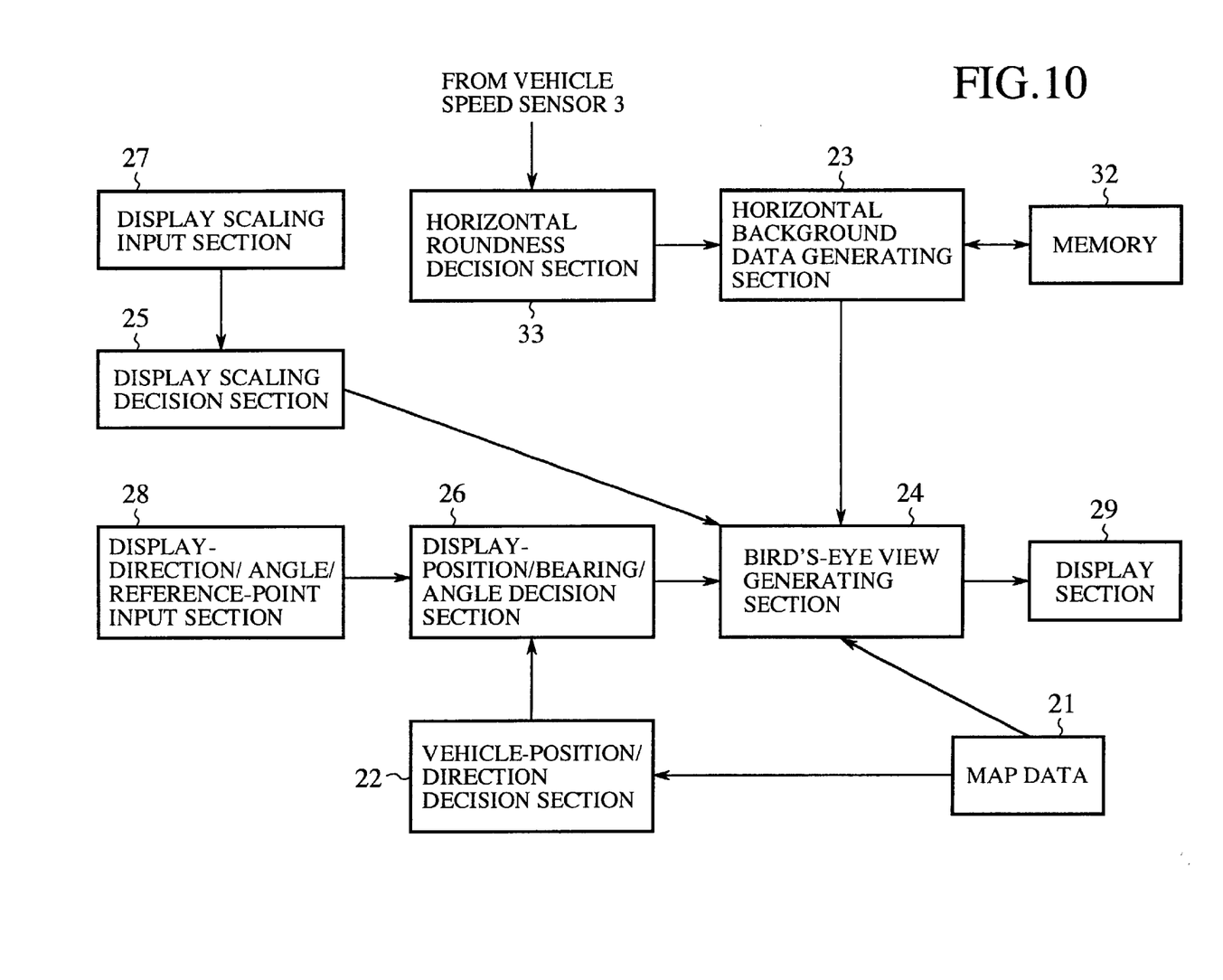
FIG. 10 is a functional block diagram of the navigation apparatus of an embodiment 3 in accordance with the present invention.

FIG. 10 is a functional block diagram of the present embodiment 3, in which a horizontal roundness decision section 33 for deciding the degree of the roundness in accordance with the vehicle speed is added to the functional block diagram of the foregoing embodiment 1. The horizontal roundness decision section 33 decides the degree of roundness in accordance of the vehicle speed fed from the vehicle speed sensor 3. According to the decision result, the horizontal background data generating section 23 reads appropriate pasted background data from the memory 32, and generates the horizontal background data. Thus, it can display the bird's-eye view with varying the roundness of its-horizon in response to the vehicle speed.

As described above, the present embodiment 3 is configured such that the roundness of the horizontal background data of the bird's-eye view is varied in response to the vehicle speed. Thus, increasing the roundness with the vehicle speed can present a user such a feeling as though he or she were approaching the horizon more quickly, thereby enhancing the sense of realism of the bird's-eye view display.

Embodiment 4

As illustrated in FIG. 4, there is a display inhibition region 113 of the land mark and destination mark in a region close to the background image region 102 in the map image region 101. In view of this, the present embodiment 4 prepares a plurality of horizontal background data to be pasted that are generated in such a manner that the horizontal roundness is fit to the display inhibition region 113, and stores these data in the memory 32 in advance. Then, one of the horizontal background data to be pasted with the horizontal roundness decided according to the display scaling or vehicle speed is read from the memory 32, and is superimposed upon the map data which is transformed to the bird's-eye view.

As described above, the present embodiment 4 can round the horizon within the display inhibition region 113 of the land mark and destination mark. Accordingly, it can maintain appropriate display conditions without eliminating the display of such items as the destination mark even if the degree of the roundness is varied. As a result, it can achieve the bird's-eye view display with a sense of realism.

The foregoing embodiments superimpose the background data upon the map data transformed into the bird's-eye view. As a result, the horizon of the background image can be displayed as it is even when the map image is scrolled, thereby allowing the scroll of the map image without any problem.

What is claimed is:

1. A map display method in a navigation system having a bird's-eye view display function comprising:

displaying a map image in conjunction with a background image;

displaying a horizon that indicates a boundary between the map image and the background image, the horizon being rounded at least in part;

preparing a plurality of background data with different degrees of roundness of the horizon;

selecting one of the background data in accordance with a vehicle speed; and displaying the background data by superimposing the background data upon the map data.

2. The map display method in a navigation system according to claim 1, wherein the horizon is rounded within a display inhibition region which is adjacent to the background image, and in which display of a land mark or a destination mark of the map image is inhibited.

3. A navigation apparatus comprising:

a bird's-eye view generating section for generating a bird's-eye view from map data input in accordance with a display target area;

a display section for displaying the bird's-eye view;

a horizontal background data generating section for generating background data including a rounded horizon as a background image to be superimposed upon a map image corresponding to the map data a memory for storing a plurality of background data with different degrees of roundness of the horizon; and a horizontal roundness decision section for deciding a degree of roundness of the horizon in response to a speed of a vehicle detected by a vehicle speed sensor, wherein said horizontal background data generating section reads from said memory the background data with the degree of roundness determined by said horizontal roundness decision section.

4. The navigation apparatus according to claim 3, wherein the display target area is decided in accordance with a display scaling, a display angle, a display position and a bearing of a vehicle.

* * * * *